L. BROWN.
CRANKING DEVICE FOR TRACTORS.
APPLICATION FILED AUG. 28, 1920.

1,386,837.

Patented Aug. 9, 1921.

INVENTOR.
Lee Brown
BY
ATTORNEY

UNITED STATES PATENT OFFICE.

LEE BROWN, OF MODESTO, CALIFORNIA.

CRANKING DEVICE FOR TRACTORS.

1,386,837. Specification of Letters Patent. Patented Aug. 9, 1921.

Application filed August 28, 1920. Serial No. 406,719.

*To all whom it may concern:*

Be it known that I, LEE BROWN, a citizen of the United States, residing at Modesto, in the county of Stanislaus, State of California, have invented certain new and useful Improvements in Cranking Devices for Tractors; and I do declare the following to be a full, clear, and exact description of the same, reference being had to the accompanying drawings, and to the characters of reference marked thereon, which form a part of this application.

This invention relates to improvements in starting or cranking devices for tractors, especially Fordson tractors and the like which are not equipped with self-starters.

The principal object of the invention is to provide an attachment, removably connected to the crankshaft of the motor of the tractor and to an exterior source of power, such as one of the driven wheels of an automobile mounted free to turn without moving the vehicle itself, by means of which the motor may be started or turned over as many times as required, without physical effort on the part of the driver.

This device is not so much intended to merely start the motor every time it is stopped for any reason or even at the commencement of a day's run, especially in summer, when conditions are favorable for early starting.

A considerable amount of repair work however is done to tractors in the field during a season, such as regrinding the valves, inserting new piston rings, cleaning the cylinders, etc. These jobs are attended to without taking the tractor to a repair shop by a traveling service-man.

I have found from experience in such an occupation that after a tractor, especially one of the Fordson type, has been cleaned or generally overhauled as stated, it is almost impossible to get the motor started by "turning it over" by hand, due to the fact that until oil works around the rings, and the valves wear themselves in properly, there is not sufficient compression to draw in a fuel charge.

By means of my improved device however, partly mounted on the service-man's car, the tractor-motor may be turned over as long as required without any physical effort being required other than the jacking up of one of the drive wheels of the car which furnishes the power.

A further object of the invention is to produce a simple and inexpensive device and yet one which will be exceedingly effective for the purposes which it is designed.

These objects I accomplish by means of such structure and relative arrangement of parts as will fully appear by a perusal of the following specification and claim.

In the drawings similar characters of reference indicate corresponding parts in the several views.

Figure 1:
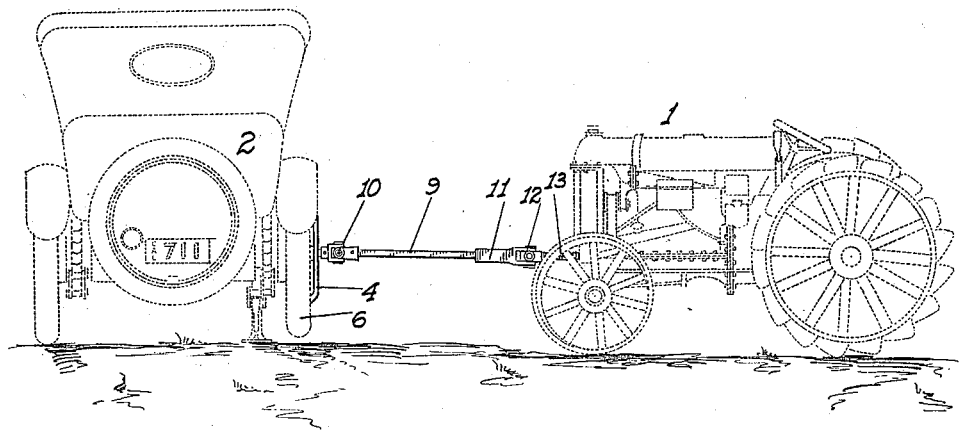
Figure 1 shows my improved attachment as connected to an automobile wheel and to a tractor of the Fordson type.
Figure 2:
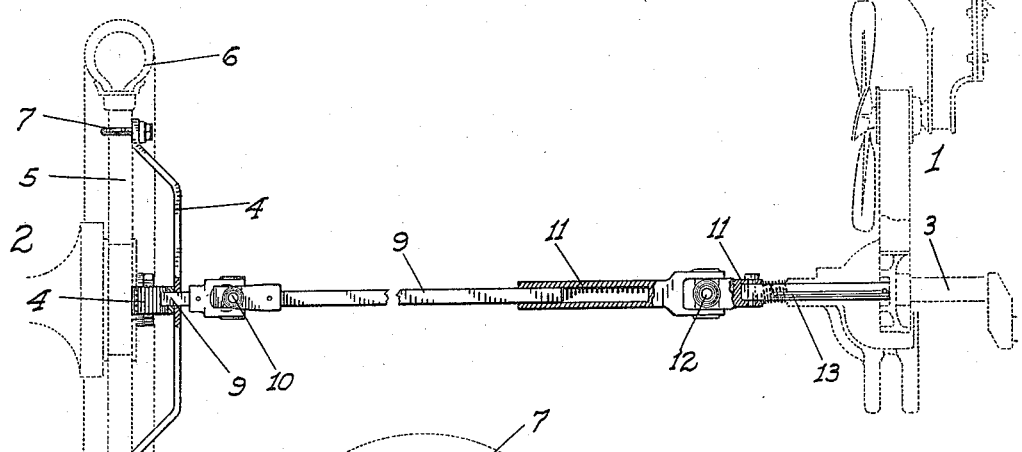
Fig. 2 is an enlarged view of the device, partly broken out, showing more fully the manner of coupling the same to the automobile and tractor.
Figure 3:
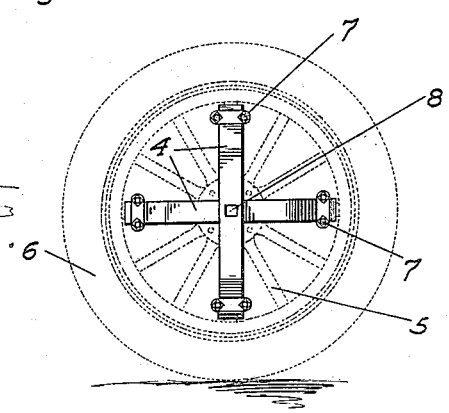
Fig. 3 is a side elevation of an automobile wheel, showing a removable shaft holding frame or bracket thereon.

Referring now more particularly to the characters of reference on the drawings, the numeral 1 denotes in general the tractor, and 2 in general an automobile, positioned a certain distance ahead of the tractor, at right angles thereto, and alined so that the rear axle of the car is substantially in alinement with the crankshaft 3 of the tractor-motor.

My starting device comprises a bracket 4 preferably consisting of a pair of iron straps positioned at right angles to each other, and arranged to be clamped to the spokes 5 of one of the drive wheels 6 of the automobile by means of U-bolts 7, said bracket projecting outwardly from the face of the wheel a suitable distance.

In alinement with the axis of the wheel, a square orifice 8 is cut through the bracket straps, adapted to receive one end of a square shaft 9, in which is interposed a universal joint 10, preferably close to the bracket.

The other end of this shaft is slidably mounted in a square-bored sleeve 11 interposed in which is another universal joint 12, the sleeve beyond the joint and shaft 9 being adapted to be removably fitted over the squared end of the motor-turning shaft 13 commonly provided with a handle to turn same by hand.

In the Fordson type of tractor, the motor-turning shaft as provided with the same must be replaced by a shaft shaped to enter the sleeve 11, since on this tractor the handle is formed integral with the shaft and would interfere.

When equipping such tractors to adapt them to be started with my device, a suitable handle for the shaft 13 would of course be also provided.

In operation, the automobile is positioned so that the drive wheel having the bracket 4 thereon is facing the tractor, and substantially at right angles thereto and in central alinement therewith, as stated. Such wheel is then jacked up to clear the ground, as shown in Fig. 1, and the car blocked to prevent movement. The shaft structure $9^{12}$ is then fitted to the bracket 4 and shaft 13, and the car-motor started, the power thereof being then transmitted to the jacked-up wheel, and of course to the tractor-motor shaft also.

Owing to the provision of the two universal joints the automobile wheel and tractor need not be exactly at right angles to, nor in alinement either horizontally or vertically, with the tractor-motor shaft, since these joints of course give flexibility to the shaft members. Neither is it necessary to position the automobile an exact distance ahead of the tractor, since the sleeve 11 is of sufficient length to allow a certain amount of variation of spacing of the two vehicles.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:—

In combination with a tractor having a shaft projecting therefrom and connected to the crank shaft of the motor thereof, a power-driven vehicle positioned ahead of and substantially at right angles to the tractor, one of the driven wheels of the vehicle being substantially concentrically alined with the tractor-shaft, a bracket removably fitted to the wheel and provided with an orifice axially thereof, the wheel being raised from the ground, a shaft removably fitted into said orifice to turn with the bracket and wheel, a sleeve slidable on said shaft but turnable therewith and connected with the tractor-shaft to turn the same, and flexible joints interposed in the first named shaft and sleeve.

In testimony whereof I affix my signature.

LEE BROWN.